Figure 1:
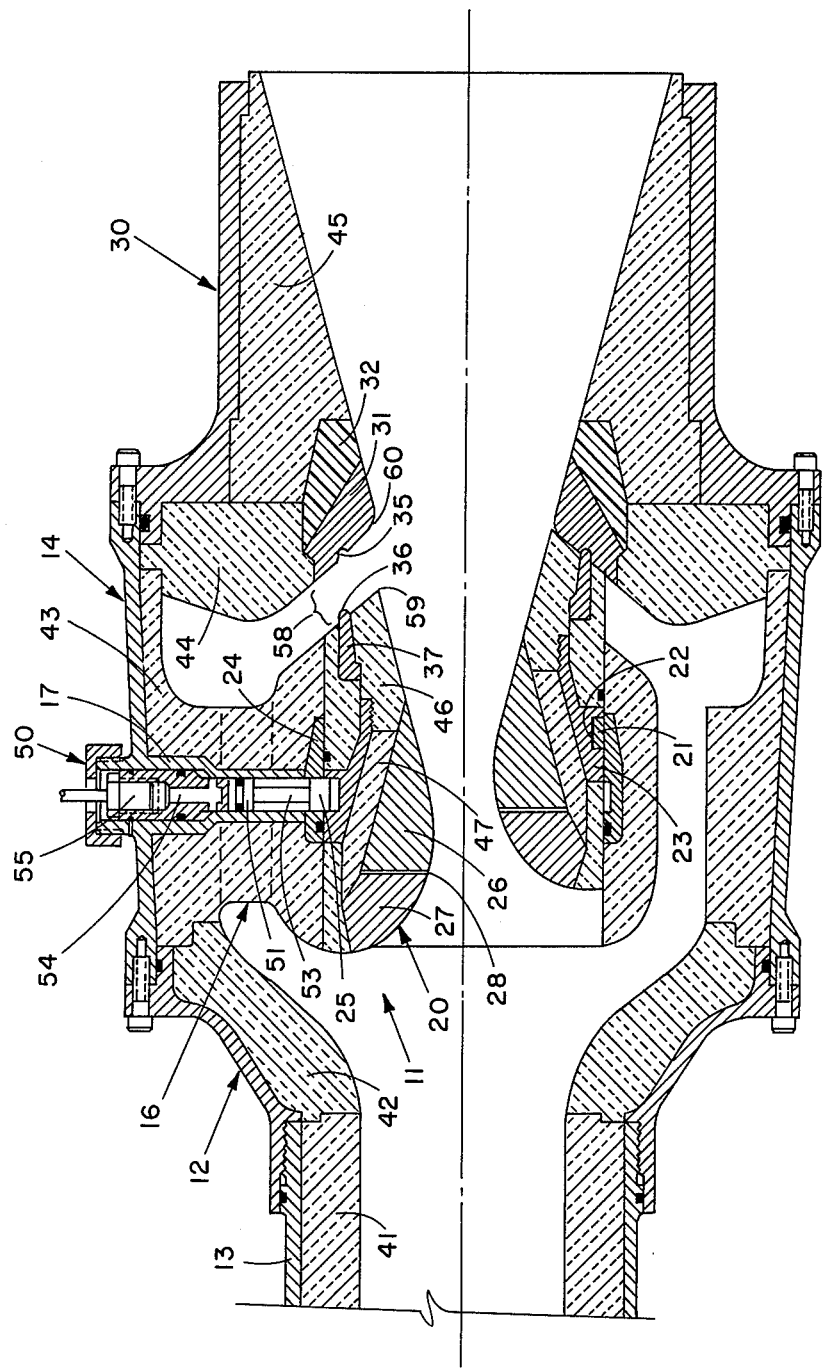

United States Patent [19]

Ebeling, Jr.

[11] 4,109,867
[45] Aug. 29, 1978

[54] TWO-POSITION NOZZLE

[75] Inventor: Charles E. Ebeling, Jr., Ridgeley, W. Va.

[73] Assignee: The United States of America as represented by the Secretary of the Navy, Washington, D.C.

[21] Appl. No.: 759,593

[22] Filed: Jan. 14, 1977

[51] Int. Cl.² .............................................. B64D 33/04
[52] U.S. Cl. .................................. 239/265.15; 60/242
[58] Field of Search ...................... 239/265.15, 265.33, 239/265.19, 265.11, 265.37; 60/242, 231

[56] References Cited

U.S. PATENT DOCUMENTS

| | | | |
|---|---|---|---|
| 3,373,940 | 3/1968 | Loprete et al. | 239/265.15 |
| 3,914,935 | 10/1975 | Burkes, Jr. | 60/242 |

Primary Examiner—James B. Marbert
Attorney, Agent, or Firm—R. S. Sciascia; L. I. Shrago; C. E. Vautrain, Jr.

[57] ABSTRACT

A dual-position nozzle having a stationary outer support structure or throat holder and an inner sustain throat assembly which translates during boost-sustain transition is provided. The throat holder includes inner and outer metal support rings joined by three tubular struts. During boost operation, the sustain nozzle assembly is mechanically joined to the throat holder by a split beveled retaining ring which is engaged in a groove in the inner metal ring of the throat holder. Upon command, expanding gases act to withdraw a pin from a gap in the retaining ring permitting the sustain nozzle to translate under viscous and pressure forces to the sustain phase position.

10 Claims, 2 Drawing Figures

TWO-POSITION NOZZLE

The present invention relates generally to improvements in dual thrust rocket motor nozzles and, more particularly, to a new and improved nozzle wherein an inner sustain throat assembly is translated during the boost-sustain transition with respect to a stationary throat holder.

It has been shown by a detailed boost phase flow analysis that areodynamic loading of a dual-position boost-sustain nozzle centerbody results in high compressive hoop loads and a counter-clockwise moment about the cross-sectional centroid of the sustain nozzle support ring. Furthermore, the minimum annular area between the boost and sustain nozzle determines the magnitude and direction of the axial load component. For an infinite reservoir, this component increases asymptotically as the sustain nozzle centerbody approaches the boost nozzle during boost-sustain phase transition, imparting rapid acceleration and high velocity to the sustain nozzle. By letting the system depressurize at boost termination to a pressure level which does not hamper propellent combustion before actuating the sustain nozzle, on the order of 800 psia, the danger of over-pressurization from premature transition is eliminated and the axial forces driving the sustain nozzle are reduced by an amount proportional to the pressure decay. Because of the large motor free volume which exists in some embodiments as a result of an expended boost propellent, actuation of the sustain nozzle at the lower pressure results in a 2- to 3-second transitional phase between boost and sustain operation. This transition time would obviously be less if the nozzle were used with smaller dual phase motors. Since in the present embodiment the sustain nozzle translation time is much less than the motor transition time, the resultant axial force driving the sustain nozzle is nearly constant with stroke. For these and other features the present invention provides an improved boost-sustain nozzle which has among its advantages less moving mass, a reduced envelope, lower weight and an improved retention/release mechanism.

Accordingly, it is an object of the present invention to provide a boost-sustain nozzle which may accommodate a continuous circumferential sustain nozzle support/release mechanism.

Another object of this invention is to provide a boost-sustain nozzle with supports which prevent cocking and hence improper seating of the sustain nozzle centerbody during boost-sustain transition.

A further object of this invention is to provide a boost-sustain nozzle which does not interfere with aerodynamic fin control mechanism housings and reduce access to release mechanism pyrotechnics.

Figure 2:
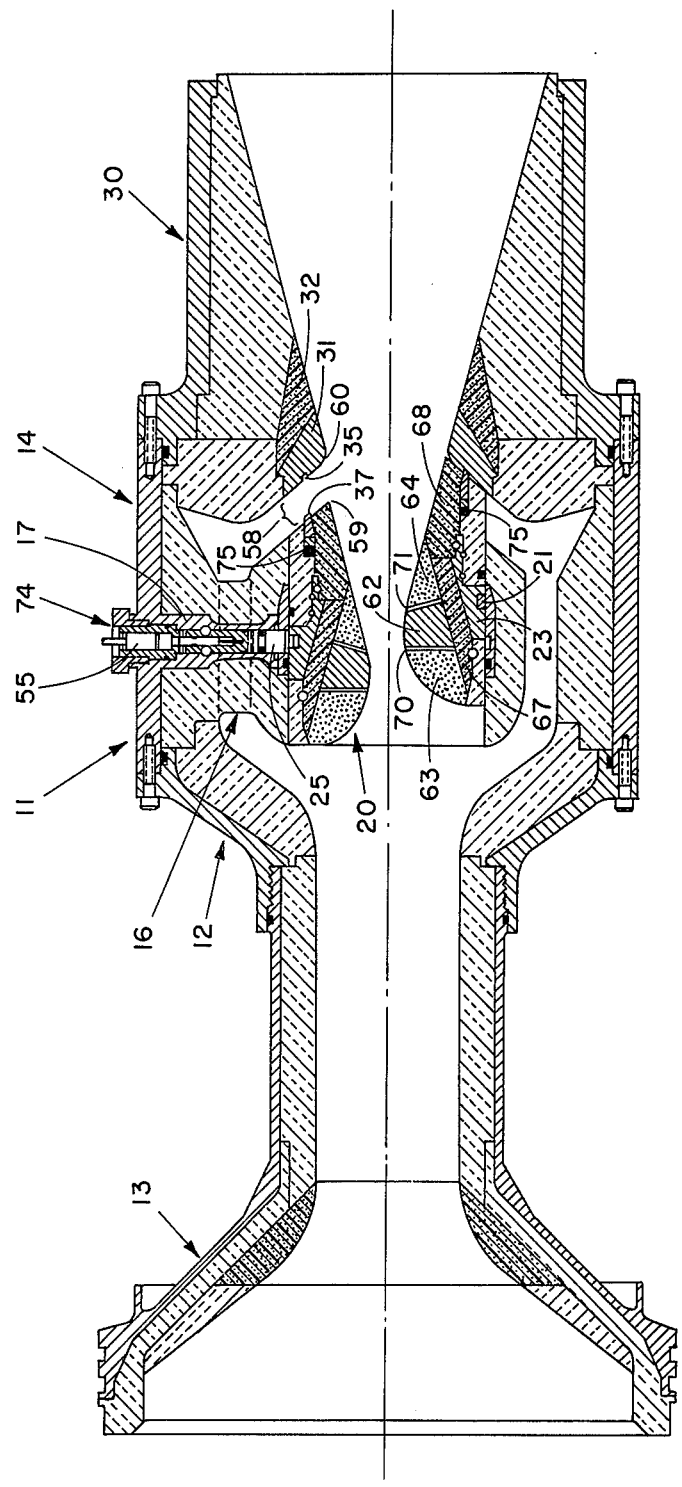

Other objects, advantages and novel features of the invention will become apparent from the following detailed description thereof when considered in conjunction with the accompanying drawings in which like numerals represent like parts throughout and wherein:

FIG. 1 is a sectional view of one embodiment of the boost-sustain nozzle of the present invention having a moveable center plug; and FIG. 2 is a sectional view of a preferred embodiment of the boost-sustain nozzle of the present invention.

The dual-position nozzle of the present invention comprises, in general, a stationary outer support structure or throat holder and an inner sustain throat assembly which translates during boost-sustain transition. The throat holder includes inner and outer metal support rings joined by three tubular struts. During boost operation, the sustain nozzle assembly is mechanically joined to the throat holder by a split beveled retaining ring which is engaged in a groove in the inner metal ring of the throat holder. Upon command, expanding gases act to withdraw a pin from a gap in the retaining ring permitting the sustain nozzle to translate under viscous and pressure forces to the sustain phase position.

Referring to the drawings, FIGS. 1 and 2 show a boost-sustain nozzle assembly 11 which includes a nozzle transition assembly 12 that is attached by conventional means to a closure blast tube 13 and to which is attached an insulated throat holder assembly 14. One of three struts 16 is shown which are attached to assembly 14 and are stationary. Struts 16 preferably are teardrop-shaped in outer configuration and contain an inner tubular steel support 17 which houses a sustain nozzle outer ring. The tubular support insulation forms part of the pressure vessel. A sustain nozzle assembly 20 is mechanically joined to throat holder assembly 14 by a beveled split retaining ring 21 which is engaged in a groove 22 in a sustain nozzle metal support 23 in assembly 20 and an inner metal ring 24 in strut 16. Retaining ring 21 is held in an open or expanded position by the end of a pyrotechnically operated ball-release pin 25 which is housed in one of the strut supports 16. Groove 22 is slightly deeper than the total height of beveled retaining ring 21.

In the FIG. 1 embodiment, the throat of nozzle assembly 20 preferably includes a copper-infiltrated tungsten section 26 and an extruded graphite section 27 which may be of Graph-I-Tite G-90, a product of Graphite Products Division, Niagara Falls, New York, with a thermal expansion gap 28 separating the sections. The sustain nozzle assembly is configured to mate with a boost nozzle assembly 30 which has a copper-infilitrated tungsten throat 31 embedded in a carbon phenolic tape ring 32, with throat 31 having a recess 35 for accommodating a mating extension 36 of a copper-infiltrated tungsten seal ring 37. The peripheries of blast tube 13, transition assembly 12, throat holder assembly 14 and boost nozzle 30 are preferably made of No. 4130 steel while the remaining structures thereof preferably are made of suitably configured sections of, respectively, at 41 an elastomeric modified carbon phenolic, MX CE280, at 42–45 a silica phenolic, MX 2646, ⅛ × ⅛ chopped fibers, and at 46 and 47 a carbon phenolic tape, MX 4926, taped 10° to the normal to the centerline. The product designations for the structures at 41–47 are those of their manufacturer, Fiberite Corporation, Winona, Minnesota. A pin puller assembly indicated at 50 is generally conventional in operation and includes pin 25, a piston 51 and a piston shaft 53, an opening 54 to receive shaft 53, and associated conventional release means actuated by an electrically initiated squib 55 which is housed in a cavity in the pin puller assembly. Shaft 53 is in effect a spring-loaded ball release pin which is actuated by expanding gases produced by the squib, simultaneously releasing the balls and exposing bleed ports which allow the expanding gases to act on the pin puller piston and move the piston outboard, withdrawing pin 25 from the gap is beveled retaining ring 21.

In one embodiment, the annular area 58 between the aft face in the boost nozzle position 59 and the forward face in the sustain nozzle position 60 preferably are sized to yield a net axial load of approximately 2,000 lbf aft on the sustain throat for a motor operating pressure of 2,000 psi. Corresponding gas velocities in the strut and sustain-boost throat annular areas are Mach 0.35 and 0.55, respectively. For an 800 psi nozzle actuation pressure, the axial load tending to move the nozzle aft is estimated to be 800 lbf. Upon pin puller actuation, this axial load acting on the beveled edge of the retaining ring impresses the ring into groove 22 in the sustain nozzle and drives the sustain nozzle aft against the boost nozzle throat as shown in the lower position of nozzle assembly 20 in FIG. 1. The net axial load increases with aft movement, producing increasing acceleration and velocity as the sustain throat approaches the boost throat. The sustain throat copper-infiltrated tungsten steel ring 31 is cushioned by deformation of an O-ring, not shown, ahead of and in line with seal ring 37. In this embodiment, a normal deflection of 0.040 inches is required to fill the rectangular groove which contains the O-ring. Seal ring 37 and its mating groove 35 in the boost nozzle are intended to provide a welded seal upon complete actuation of the sustain nozzle assembly. The outer surface of groove 35 preferably is tapered to provide a clearance with seal ring 37, and allowances are made for tolerances and a 1,000° F differential temperature.

In FIG. 2 a more rugged nozzle assembly than that of the embodiment of FIG. 1 is shown with a capability of withstanding pressures on the order of from 2,600 to 3,700 psia. The FIG. 2 embodiment is configured to mate with existing flightweight aft closure/blast tube housings and performs under boost-only or sustain-only operation as well as all-up boost-sustain operation. The major variations in the FIG. 2 nozzle are in sustain nozzle assembly 20 and boost nozzle assembly 30. In the sustain nozzle assembly, a copper-infiltrated tungsten throat insert 62 is protected at its leading edge by a Graph-I-Tite G-90 entrance cap 63 to provide a uniform erosion gradient in the approach, thus minimizing turbulence and increasing nozzle efficiency. A second Graph-I-Tite G-90 insert 64 is placed along the trailing edge of the tungsten throat insert in the highly erosive supersonic region immediately downstream of the throat to eliminate radial flow losses resulting from severe erosion. This throat package comprising tungsten throat insert 62 and G-90 inserts 63 and 64 is supported on contiguous conical carbon phenolic tape rings 67 and 68 which preferably are angled at 10° to the normal to the center line of the assembly. The Graph-I-Tite product is an advanced commercial extruded grade of graphite. It is made impermeable by impregnating the pores of base stock one or more times with electrical carbon and graphitized at temperatures in excess of 4700° F. The material is a fine grain, flaw-free graphite featuring high strength, high density, high purity, and maximum resistance to erosion. The "G" grades are graphite filled. The G-90 grade of Graph-I-Tite has a minimum density of 1.90 g/cc and improved impermeability. Two axial thermal expansion gaps 70 and 71 preferably of 0.06 inches are provided forward and aft of throat insert 62 and preferably are filled with polyethelene or other similar substance which softens at low temperatures, thus assuring disintegration with a minimum amount of residual solid remaining in the gap to restrict actual growth of the throat package.

A pin puller assembly 74 similar to assembly 50 in FIG. 1 and performing the same function with respect to withdrawing pin 25 is included in the embodiment of FIG. 2. Groove 35 in tungsten insert 31 achieves an interference fit with sustain nozzle seal ring 37 to form a tungsten-tungsten weld seal during boost-sustain transitions.

The ovaloid-shaped cross-section of the sustain nozzles for both embodiments was developed from flow and thermal analysis of the sustain nozzle during boost operation when subjected to severe heating from all sides. The blunt aft face of the nozzles acts to minimize the gap between the boost/sustain nozzles and to provide a uniform transition therebetween to reduce flow losses and to increase performance duing sustain operation. In the most extreme conditions, metal-to-metal contact always occurs between the boost nozzle groove outer surface and the sustain nozzle seal outer surface. Contact also always occurs between the aft face of the seal ring and the bottom of the boost nozzle groove and is maintained by the compressive load from an O-ring shock absorber 75 shown in FIG. 2. A slight clearance is maintained between the inner surfaces of the seal ring and the boost nozzle groove.

The present invention thus provides a dual-position nozzle in which only the throat area moves during the change from the boost phase to the sustain phase. This arrangement permits a fixed support for the dual-position nozzle which results in less moving mass, a reduced envelope, a lower weight and an improved retention/release mechanism. The reduced envelope is due to a reduced insulator overlap as compared to the moveable support dual-position nozzles. Other advantages are a simplified release mechanism in which a conventional gas generator squib-type pin puller may be used to replace an external ring that translates axially, more favorable bearing surfaces during actuation, a simplified tapered snap ring in the boost phase lock as against trapped ball bearings, and a sustain phase flow field interrupted by a fixed centerbody as against a continuous flow pattern over the total contraction region. Obviously, many modifications and variations of the present invention are possible in the light of the foregoing teachings.

What is claimed is:

1. A dual-position assembly for a dual-thrust rocket motor nozzle having a stationary outer support structure and throat support means extending radially into the combustion chamber from said outer support structure comprising:

a combined boost and sustain nozzle throat assembly and means slidably securing said combined assembly to said throat support means,
said combined assembly held in the forward position to form an enlarged throat area during boost phase operation of said rocket motor;
means remotely operated for selectively releasing said combined assembly substantially at the termination of boost phase operation,
said combined assembly movable upon the urging of exhaust gases from said boost phase position aft to a sustain phase position upon actuation of said remotely operated means;
stationary throat means in said nozzle for joining with said combined assembly at the termination of transition between boost phase and sustain phase operation,
said throat support means including at least three equally spaced struts;

annular support means secured to said struts for receiving in sliding relationship said combined assembly, said means remotely operated including restraining means preventing aft movement of said combined assembly in the presence of exhaust gases and means for selectively releasing said combined assembly to permit aft movement thereof to form said sustain nozzle; and an inner metal ring in said annular support means secured to said struts and a sustain nozzle support ring slidably conforming to at least a portion of the inner surface of said inner metal ring, and said restraining means including a groove in said inner metal ring and a retaining ring releasably engaged in said groove when said combined assembly is in the initial or boost phase position.

2. The dual-position assembly as defined in claim 1 wherein said remotely operated means further include a squib in at least one of said struts susceptible to remote firing, said squib disposed in a respective chamber in said strut, said squib when remotely actuated releasing said retaining ring from said groove.

3. The dual-position assembly as defined in claim 2 wherein the throat of said combined assembly is lined with at least two spaced segments of carbon phenolic material and said stationary throat means includes a lining of carbon phenolic material, said lining having an annular groove forward of the narrowest stationary throat opening and said combined assembly having a sealing ring of carbon phenolic material conforming to said groove to seal the interface between said combined assembly and said stationary throat at the commencement of sustain phase operation.

4. The dual-position assembly as defined in claim 2 wherein the central portion of the throat of said combined assembly and the throat of said stationary throat means are made of copper infiltrated tungsten, and the adjacent forward and aft portions of the throat of said combined assembly are spaced from the central portion and made of carbon phenolic material, said stationary throat means having an annular groove forward of the narrowest stationary throat opening, said combined assembly including a protruding annular segment made of copper infiltrated tungsten conforming exteriorly to said groove and sealing the interface between said stationary throat means and said combined assembly at the termination of transition between boost phase and sustain phase operation.

5. A system for effecting a transition from boost phase to sustain phase operation in a dual-thrust rocket nozzle comprising:

mounting an axially slidable throat assembly in a forward position in said nozzle for boost phase operation, said throat assembly spaced axially from an aft stationary sustain throat area during boost phase operation to provide an enlarged throat area about said assembly;

selectively releasing said throat assembly to reduce throat area for sustain phase operation by allowing exhaust gases to effect movement thereof aft into sealing engagement with said stationary throat area, said slidable throat assembly fitted within cylindrical support means deployed in the throat of said nozzle, said support means including means extending therethrough for releasably engaging a throat assembly component, said throat assembly having a peripheral support surface conforming to a substantial axially extending portion of said support means; and a split retaining ring in said throat assembly and a groove conforming thereto in said support means for receiving a peripheral portion of said ring during boost phase operation, said ring expanded into said groove by said releasably engaging means and withdrawn from said groove on withdrawal of said releasably engaging means to permit transition to sustain phase operation.

6. The system of claim 5 wherein said support means includes at least three struts, said struts secured to the outer structure of said nozzle; and a boost nozzle secured to the aft end of said rocket nozzle, said boost nozzle having an enlarged throat area with respect to the throat area of said sustain nozzle and a diagonally extending forward surface conforming to the aft surface of said slidable throat assembly, said aft surface selectively spaced from said forward surface to provide additional exhaust gas passages during boost phase operation, said aft and forward surfaces meeting in sealed relationship and closing said additional passages for sustain phase operation.

7. The system of claim 6 wherein the throat of said slidable throat assembly is lined with at least two segments of carbon phenolic material spaced for thermal expansion and the throat of said boost nozzle is lined with carbon phenolic material, said slidable throat assembly including a protruding annular segment of carbon phenolic material remote from the throat area thereof and said forward surface having a groove conforming to the protruding portion of said annular segment to effect a seal between said surfaces during sustain phase operation.

8. The system of claim 7 wherein said support means further includes a squib in at least one of said struts susceptible to remote firing, said squib disposed in a respective chamber in said strut, said squib when remotely actuated withdrawing said means extending through said support means thereby releasing said retaining ring and permitting exhaust gases to move said slidable assembly aft into engagement with said boost nozzle.

9. The system of claim 6 wherein the central portion of the throat of said slidable throat assembly and the throat of said boost nozzle are made of copper infiltrated tungsten, and the adjacent forward and aft portions of said slidable throat assembly are spaced from said central portion for thermal expansion and made of carbon phenolic material, said slidable assembly including a protruding annular segment of copper infiltrated tungsten remote from the throat area thereof and said forward surface having a groove conforming to the protruding portion of said annular segment to effect a seal between said surfaces during sustain phase operation.

10. The system of claim 9 wherein said support means further includes a squib in at least one of said struts susceptible to remote firing, said squib disposed in a respective chamber in said strut, said squib when remotely actuated withdrawing said means extending through said support means thereby releasing said retaining ring and permitting exhaust gases to move said slidable assembly aft into engagement with said boost nozzle.

* * * * *